United States Patent
Ukraintsev (10) Patent No.: US 7,797,991 B2
(45) Date of Patent: Sep. 21, 2010

(54) ROCKING Y-SHAPED PROBE FOR CRITICAL DIMENSION ATOMIC FORCE MICROSCOPY

(75) Inventor: Vladimir Alexeevich Ukraintsev, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 551 days.

(21) Appl. No.: 11/874,613

(22) Filed: Oct. 18, 2007

(65) Prior Publication Data
US 2009/0100917 A1  Apr. 23, 2009

(51) Int. Cl.
*G01B 5/28* (2006.01)
(52) U.S. Cl. .................................................. 73/105
(58) Field of Classification Search ............... 73/105; 116/275
See application file for complete search history.

(56) References Cited

U.S. PATENT DOCUMENTS

| | | | | |
|---|---|---|---|---|
| 5,345,816 A | * | 9/1994 | Clabes et al. | 438/52 |
| 5,347,854 A | * | 9/1994 | Martin et al. | 73/105 |
| 5,382,795 A | * | 1/1995 | Bayer et al. | 850/3 |
| 5,578,745 A | * | 11/1996 | Bayer et al. | 73/1.73 |
| 5,665,905 A | * | 9/1997 | Bartha et al. | 73/105 |
| 5,907,096 A | | 5/1999 | Chen | |
| 6,091,124 A | * | 7/2000 | Bayer et al. | 257/417 |
| 6,328,902 B1 | | 12/2001 | Hantschel et al. | |
| 6,955,078 B2 | * | 10/2005 | Mancevski et al. | 73/105 |
| 7,415,868 B2 | * | 8/2008 | Hare et al. | 73/105 |
| 7,684,956 B2 | * | 3/2010 | Dahlen et al. | 702/155 |
| 2002/0189330 A1 | * | 12/2002 | Mancevski et al. | 73/105 |
| 2007/0084273 A1 | * | 4/2007 | Hare et al. | 73/105 |

FOREIGN PATENT DOCUMENTS

| | | |
|---|---|---|
| EP | 1748447 | 1/2007 |
| WO | 2004015362 | 2/2004 |

* cited by examiner

*Primary Examiner*—Hezron Williams
*Assistant Examiner*—Rodney T Frank
(74) *Attorney, Agent, or Firm*—Wade J. Brady, III; Frederick J. Telecky, Jr.

(57) ABSTRACT

Measuring surface profiles of structures on integrated circuits is difficult when feature sizes are less than 100 nanometers. Atomic force microscopy provides surface profile measurement capability on flat horizontal surfaces, but has difficulty with three-dimensional structures such as MOS transistor gates, contact and via holes, interconnect trenches and photoresist patterns. An atomic force microscopy probe with two atomically sharp tips configured to facilitate measurements of three-dimensional structures is disclosed. A method of making such measurements using the disclosed probe and a method of fabricating an IC encompassing the method are also claimed.

20 Claims, 11 Drawing Sheets

ROCKING Y-SHAPED PROBE FOR CRITICAL DIMENSION ATOMIC FORCE MICROSCOPY

FIELD OF THE INVENTION

This invention relates to the field of integrated circuits. More particularly, this invention relates to metrology of physical structures in integrated circuits.

BACKGROUND OF THE INVENTION

It is well known that component sizes in integrated circuits (ICs) are decreasing, as articulated by Moore's Law. As component sizes decrease, it is increasing important to measure spatial profiles and linewidth roughnesses of structures in ICs, including MOS transistor gates, photoresist patterns, contact and via holes and interconnect trenches. Practitioners of IC fabrication metrology recognize that as structure sizes decrease, it is more difficult to measure profiles and linewidth roughness. There are several techniques in use; each has limitations. Transmission electron microscopy (TEM) is a destructive technique, and has a high sampling uncertainty due to limited throughput. Scanning electron microscopy (SEM) provides limited profile information. Scatterometry requires dedicated test structures and independent calibration.

Atomic force microscopy (AFM) overcomes many of the limitations of other metrology techniques discussed above, but, as currently practiced, has some limitations that prevent it from providing complete profile and linewidth roughness information. AFM uses a probe tip to determine a position of a point on a surface of a structure being measured. Tips in current use with rounded ends, such as the "tripod" tip, typically with radii of approximately 5 nanometers, cannot provide profile information in corners of structures, for example intersections of MOS transistor gates with gate dielectrics or active areas, where radii of curvature of structures may be less than 2 nanometers. Moreover, during use of a tripod tip configuration to profile an intersection of a vertical surface and a horizontal surface, it is uncertain which tip of the tripod is making contact with the horizontal surface, thus generating uncertainty in the measurement data. Tips in current use with tapered ends, such as "flare" tips, typically have vertical offsets that prevent profiling of the same corners discussed above. Both flare probes and tripod probes are too large to measure profiles of many contact holes and via holes. Tips in current use with wide ends to increase sampling area, such as square flare tips, require alignment and suffer from adhesion to IC surfaces. AFM techniques in current use that utilize sharp tips and rely on a known, controlled angle between the tip and the measured structure are prone to measurement error, and cannot accurately measure profiles of many via holes or contact holes.

SUMMARY OF THE INVENTION

This Summary is provided to comply with 37 C.F.R. §1.73, requiring a summary of the invention briefly indicating the nature and substance of the invention. It is submitted with the understanding that it will not be used to interpret or limit the scope or meaning of the claims.

This invention is a probe for an atomic force microscope with two atomically sharp tips that are configured to allow lateral distance measurements and surface profile measurements of structures in integrated circuits, including structures with features less than 100 nanometers. A method of making lateral distance measurements and surface profile measurements using an atomic force microscope with a probe having two atomically sharp tips is also claimed.

DETAILED DESCRIPTION

The present invention is described with reference to the attached figures, wherein like reference numerals are used throughout the figures to designate similar or equivalent elements. The figures are not drawn to scale and they are provided merely to illustrate the invention. Several aspects of the invention are described below with reference to example applications for illustration. It should be understood that numerous specific details, relationships, and methods are set forth to provide a full understanding of the invention. One skilled in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

For the purpose of facilitating the reading of this disclosure, the term "atomically sharp" is understood to mean "tapered in a conical configuration to an end consisting of at least a single atom." The term "critical dimension" or "CD" is understood to mean a lateral dimension of a structure; for examples, the CD of a gate in an MOS transistor is a width of the gate material, and the CD of a via hole is an internal diameter of the via hole. The term "diamond like carbon" is understood to mean a conductive material composed substantially of carbon with a mechanical hardness higher than silicon or tungsten.

Figure 1A:
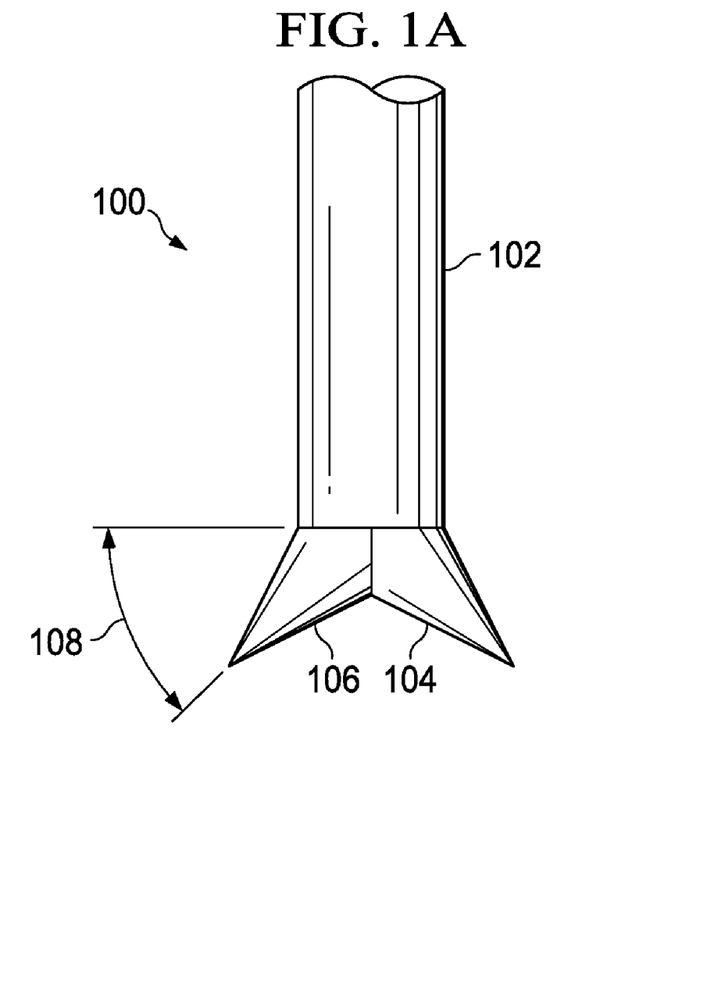
FIG. 1A and FIG. 1B are views of an AFM probe according to an embodiment of the instant invention.
Figure 1B:
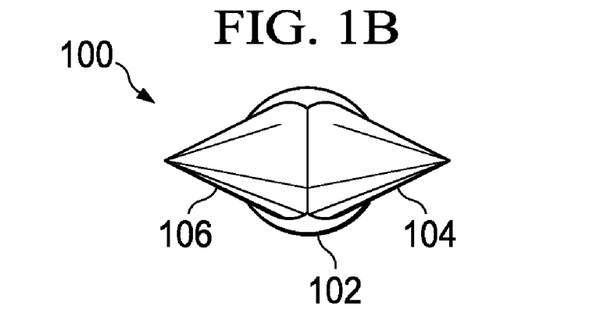

FIG. 1A and FIG. 1B are views of an AFM probe according to an embodiment of the instant invention. FIG. 1A is a side view of the probe; FIG. 1B is a bottom view of the probe.

AFM probe (100) includes a probe shaft (102), a right tip (104) that is conically shaped, atomically sharp and angled downward approximately 45 degrees to the right of the probe shaft (102), and a left tip (106) that is also conically shaped, atomically sharp and angled downward approximately 45 degrees to the left of the probe shaft (102). Both right tip (104) and left tip (106) extend beyond the radius of the probe shaft (102) several nanometers, as depicted in FIG. 1B. The probe is tilted between 2 and 10 degrees during a profile measurement of an intersection of a horizontal surface and a vertical surface, for example, an intersection of a gate sidewall with an IC substrate. A preferred downward angle (108) for each tip (104, 106) is 45 degrees minus the tilt angle of 2 to 10 degrees. Shaft (102) may be made of carbon nanotube material or other material. Right tip (104) and left tip (106) may be made of diamond-like carbon, or other hard, conducting material. An advantage of using conically shaped, atomically sharp tips is that conically shaped, atomically sharp tips are more easily maintained in routine use than flared or rounded tips, because an atomically sharp tip may be cleaned and sharpened using field emission techniques without removing it from the AFM, while flared or rounded tips cannot be maintained so. Another advantage of the use of atomically sharp tips is that they can provide higher resolution profiles than rounded or flared tips.

Figure 2A:
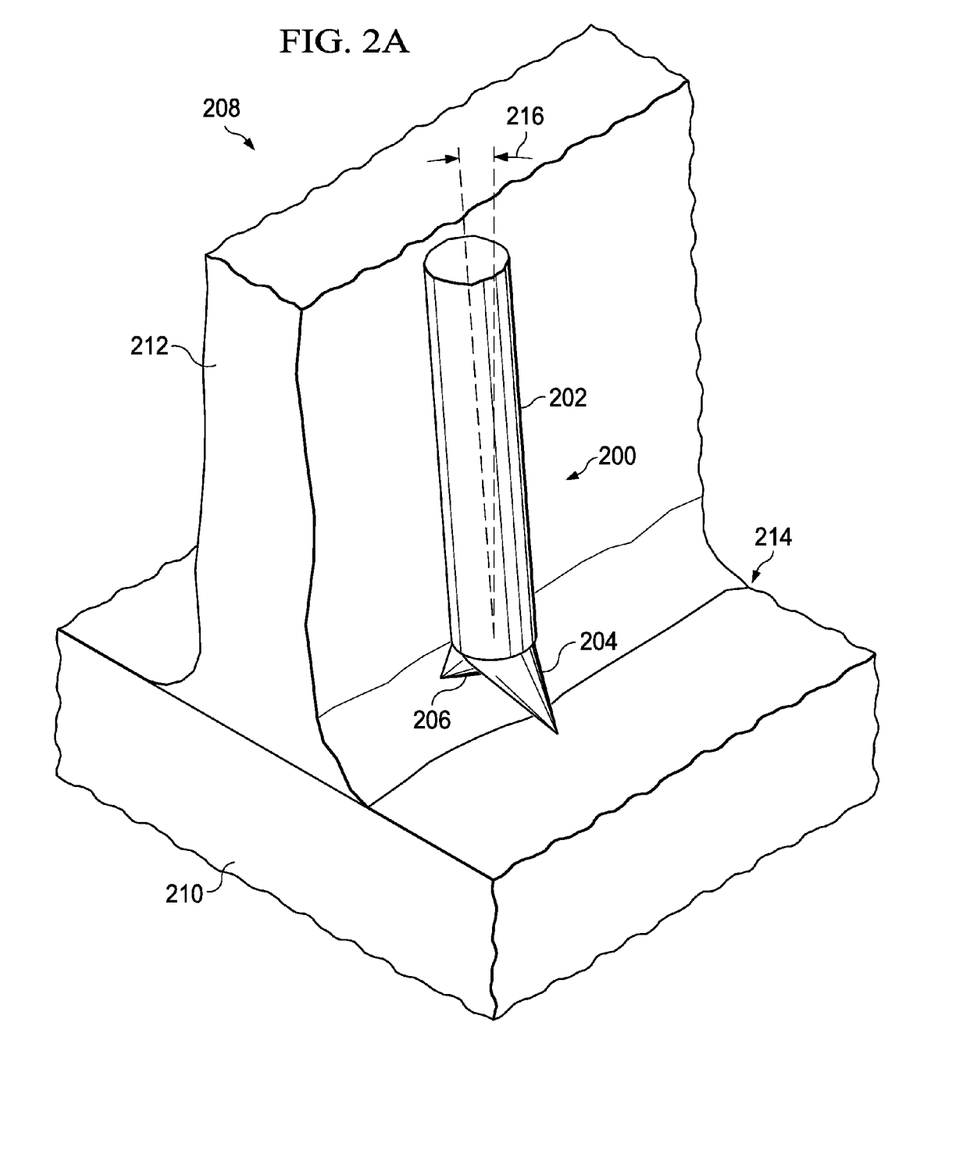
FIG. 2A and FIG. 2B are perspective views of an IC during a profile measurement of a MOS transistor gate using an AFM probe according to an embodiment of the instant invention.
Figure 2B:
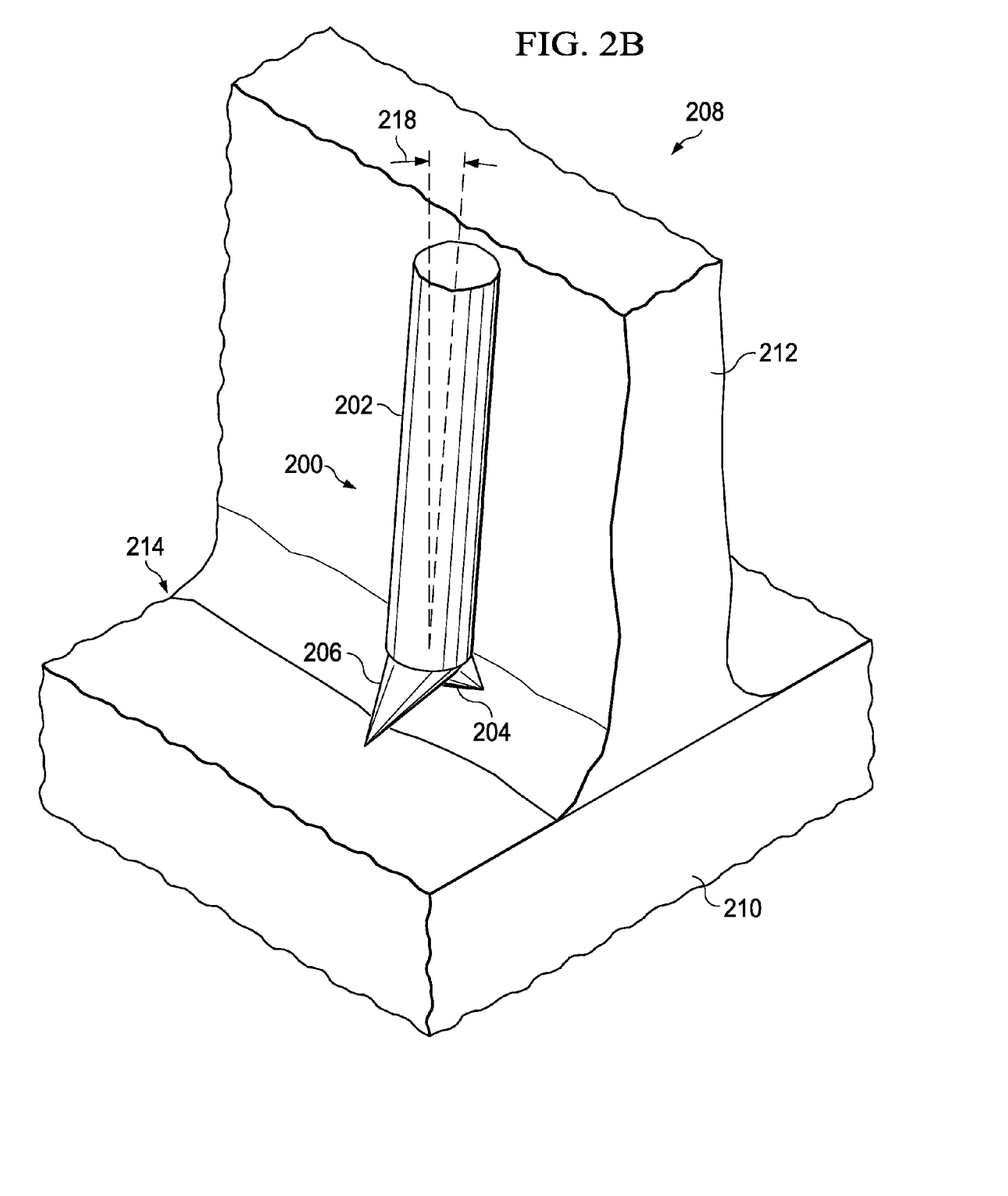

FIG. 2A and FIG. 2B depict an AFM probe according to an embodiment of the instant invention during a CD and profile measurement of a MOS transistor gate in an integrated circuit. FIG. 2A depicts the AFM probe during a measurement of the right profile of the gate. FIG. 2B depicts the AFM probe during a measurement of the left profile of the gate.

Referring to FIG. 2A, IC (208) includes a substrate (210) and a MOS transistor gate (212). The region of intersection (214) of the gate (212) with the substrate (210) may have a radius of curvature less than 2 nanometers. AFM probe (200) is tilted to the left by an angle (216) sufficient to prevent contact of the substrate (210) by the right tip (204), and to attain an orientation for measuring a right-side profile of gate (212) using the left tip (206). The atomically sharp property and downward angle of the left tip are advantageous because, when tilted as depicted in FIG. 2A, contact of only the left tip (206) with the integrated circuit (200) is ensured, and thus the left tip (206) can profile the intersection region (214) of the gate (212) with the substrate (210). The tilt angle (216) need not be known precisely to execute a profile measurement; this is advantageous because measurement execution is facilitated. The atomically sharp tip (206) can provide a higher resolution lateral profile, known as line width roughness, of the gate (212) than a tip with a rounded shape. Gates made of polycrystalline silicon typically have grain sizes of a few nanometers. Probes with atomically sharp tips can produce profiles that accurately depict individual grains, which is not practical using probed with rounded tips. Higher resolution profiles are advantageous for practitioners of integrated circuit fabrication.

Referring to FIG. 2B, AFM probe (200) is tilted to the right by an angle (218) sufficient to prevent contact of the substrate (210) by the left tip (206), and to attain an orientation for measuring a left-side profile of gate (212) using the right tip (204). The atomically sharp property and downward angle of the right tip are advantageous because, when tilted as depicted in FIG. 2B, contact of only the right tip (204) with the integrated circuit (200) is ensured, and thus the right tip (204) can profile the intersection region (214) of the gate (212) with the substrate (210). The tilt angle (218) need not be known precisely to execute a profile measurement; this is advantageous because measurement execution is facilitated.

Figure 3A:
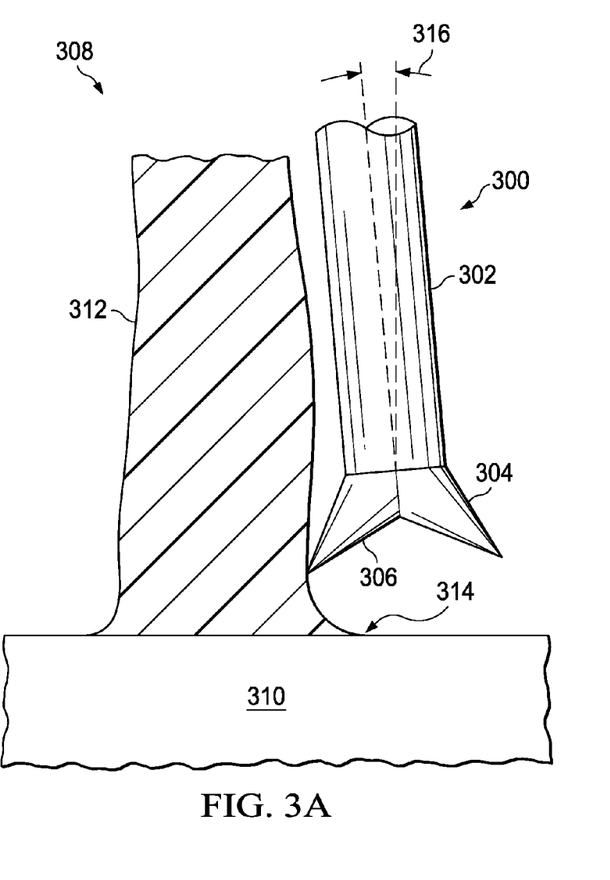
FIG. 3A and FIG. 3B are cross-sections of an IC during a profile measurement of a photoresist structure using an AFM probe according to an embodiment of the instant invention.
Figure 3B:
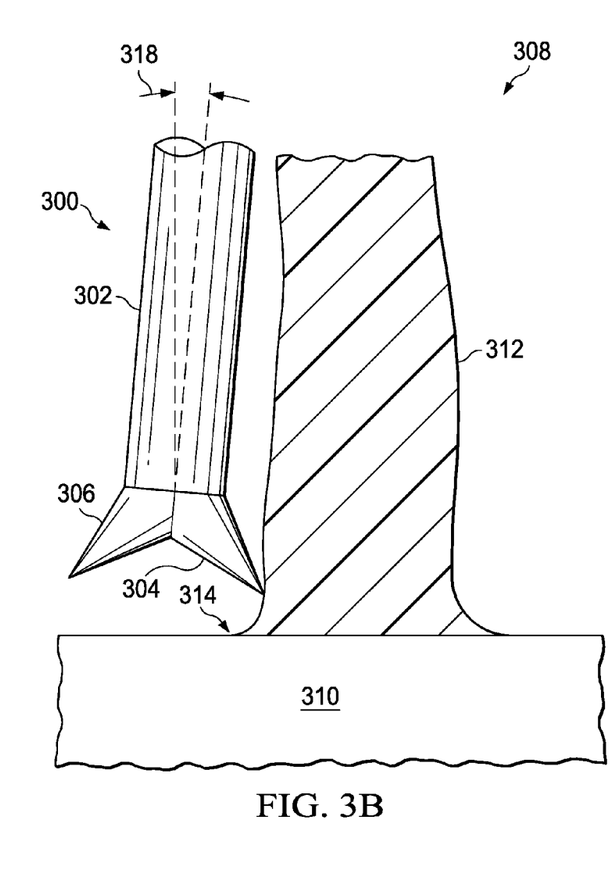

FIG. 3A and FIG. 3B depict an AFM probe according to an embodiment of the instant invention during a CD and profile measurement of a photoresist structure on an integrated circuit. FIG. 3A depicts the AFM probe during a measurement of the right profile of the photoresist structure. FIG. 3B depicts the AFM probe during a measurement of the left profile of the photoresist structure.

Referring to FIG. 3A, IC (308) includes a substrate (310) and a photoresist structure (312). The region of intersection (314) of the photoresist structure (312) with the substrate (310) may have a radius of curvature less than 2 nanometers. AFM probe (300) is tilted to the left by an angle (316) sufficient to prevent contact of the substrate (310) by the right tip (304), and to attain an orientation for measuring a right-side profile of photoresist structure (312) using the left tip (306). The atomically sharp property and downward angle of the left tip are advantageous because, when tilted as depicted in FIG. 3A, contact of only the left tip (306) with the integrated circuit (300) is ensured, and thus the left tip (306) can profile the intersection region (314) of the photoresist feature (312) with the substrate (310). The tilt angle (316) is not critical, and need not be known precisely to execute a profile measurement; this is advantageous because measurement execution is facilitated.

Referring to FIG. 3B, AFM probe (300) is tilted to the right by an angle (318) sufficient to prevent contact of the substrate (310) by the left tip (306), and to attain an orientation for measuring a left-side profile of photoresist structure (312) using the right tip (304). The atomically sharp property and downward angle of the right tip are advantageous because, when tilted as depicted in FIG. 3B, contact of only the right tip (304) with the integrated circuit (300) is ensured, and thus the right tip (304) can profile the intersection region (314) of the photoresist structure (312) with the substrate (310). The tilt angle (318) is not critical, and need not be known precisely to execute a profile measurement; this is advantageous because measurement execution is facilitated.

Figure 4:
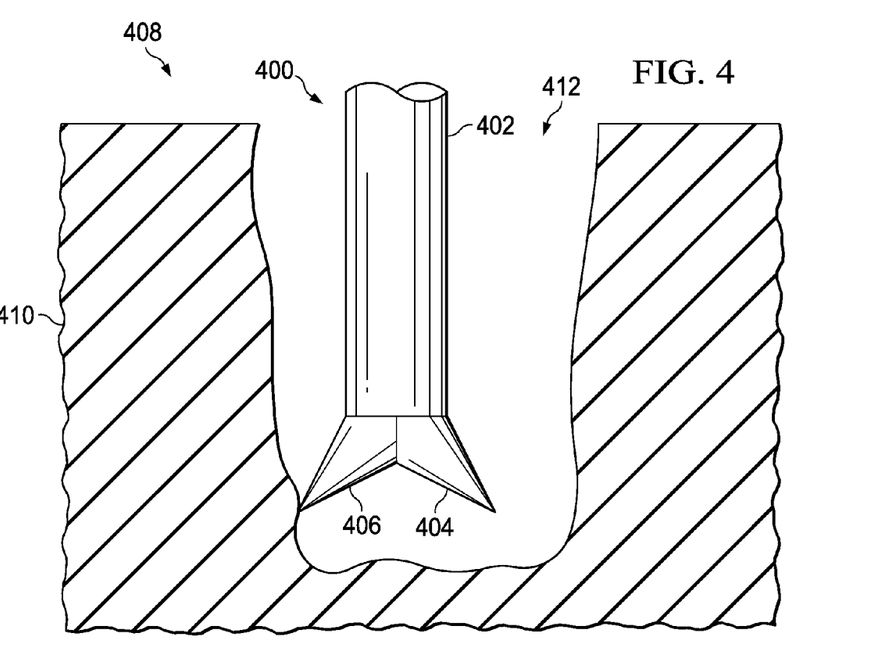
FIG. 4 is a cross-section of an IC during a profile measurement of a via hole using an AFM probe according to an embodiment of the instant invention.

FIG. 4 depicts an AFM probe according to an embodiment of the instant invention during a CD and profile measurement of an interconnect via hole in an integrated circuit. Integrated circuit (408) includes inter-level dielectric layer (410), typically formed of low-k material, in which an interconnect via hole (412), which may be less than 100 nanometers in diameter, has been formed. AFM probe (400) embodying the instant invention is positioned in via hole (412) so as to contact a surface of the via hole (412) with left probe tip (406). Construction of the AFM probe by attaching atomically sharp tips (404, 406) to a shaft (402) results in an AFM probe that is small enough to fit inside an interconnect via hole. This is advantageous because AFM probes currently in use are larger than via holes in many integrated circuits, and hence cannot be used to profile interiors of those via holes or measure their CD.

Figure 5:
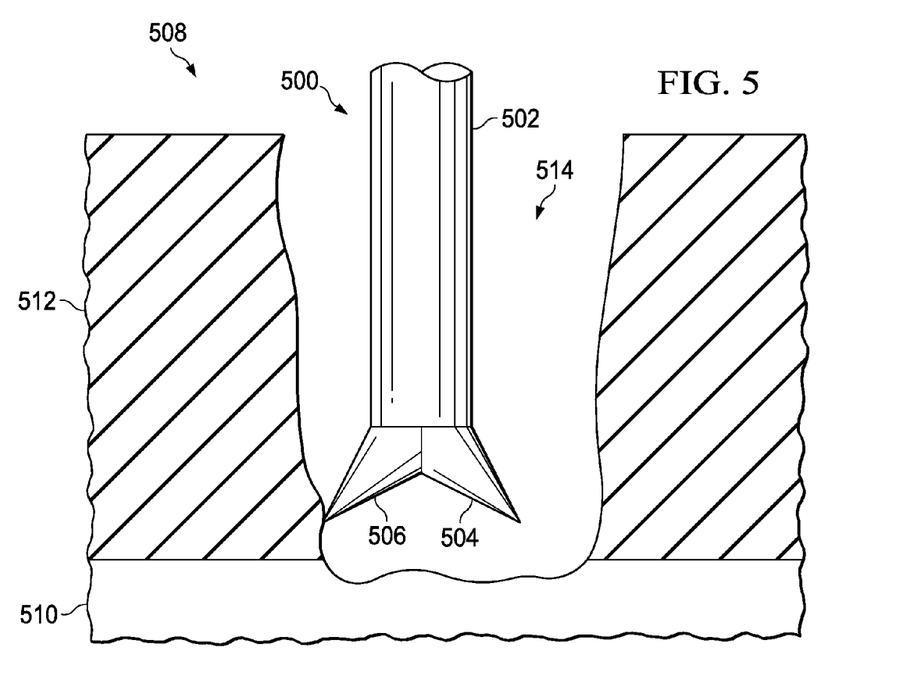
FIG. 5 is a cross-section of an IC during a profile measurement of a contact hole using an AFM probe according to an embodiment of the instant invention.

FIG. 5 depicts an AFM probe according to an embodiment of the instant invention during a CD and profile measurement of a contact hole in an integrated circuit. Integrated circuit (508) includes substrate (510) and pre-metal dielectric layer (512), typically formed of silicon dioxide, in which a contact hole (514), which may be less than 100 nanometers in diameter, has been formed. AFM probe (500) embodying the instant invention is positioned in contact hole (514) so as to contact a surface of the contact hole (514) with left probe tip (506). Construction of the AFM probe by attaching atomically sharp tips (504, 506) to a shaft (502) results in an AFM probe that is small enough to fit inside a contact hole. This is advantageous because AFM probes currently in use are larger than contact holes in many integrated circuits, and hence cannot be used to profile interiors of those contact holes or measure their CD.

Figure 6:
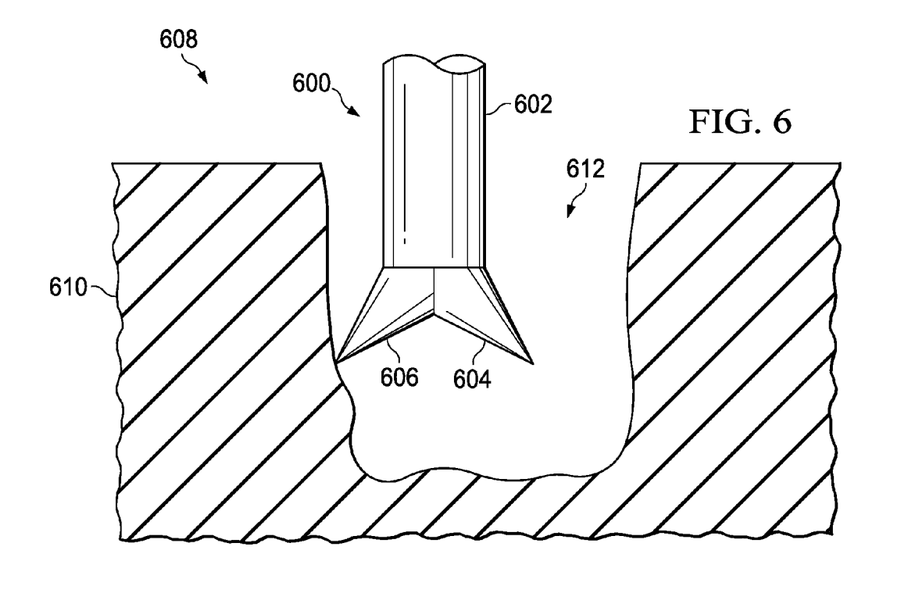
FIG. 6 is a cross-section of an IC during a profile measurement of an interconnect trench using an AFM probe according to an embodiment of the instant invention.

FIG. 6 depicts an AFM probe according to an embodiment of the instant invention during a CD and profile measurement of an interconnect trench in an integrated circuit. Integrated circuit (608) includes intra-level dielectric layer (610), typically formed of low-k dielectric material, in which an interconnect trench (612), which may be less than 100 nanometers wide, has been formed. AFM probe (600) embodying the instant invention is positioned in trench (612) so as to contact a sidewall of the trench (612) with left probe tip (606). Construction of the AFM probe by attaching atomically sharp tips (604, 606) to a shaft (602) results in an AFM probe that is small enough to fit inside a typical interconnect trench. This is advantageous because AFM probes currently in use are larger than interconnect trenches in many integrated circuits, and hence cannot be used to profile interiors of those trenches or measure their CD. In another embodiment, the AFM probe (600) may be tilted to obtain profile measurements of intersections of trench sidewalls with trench bottoms.

Figure 7:
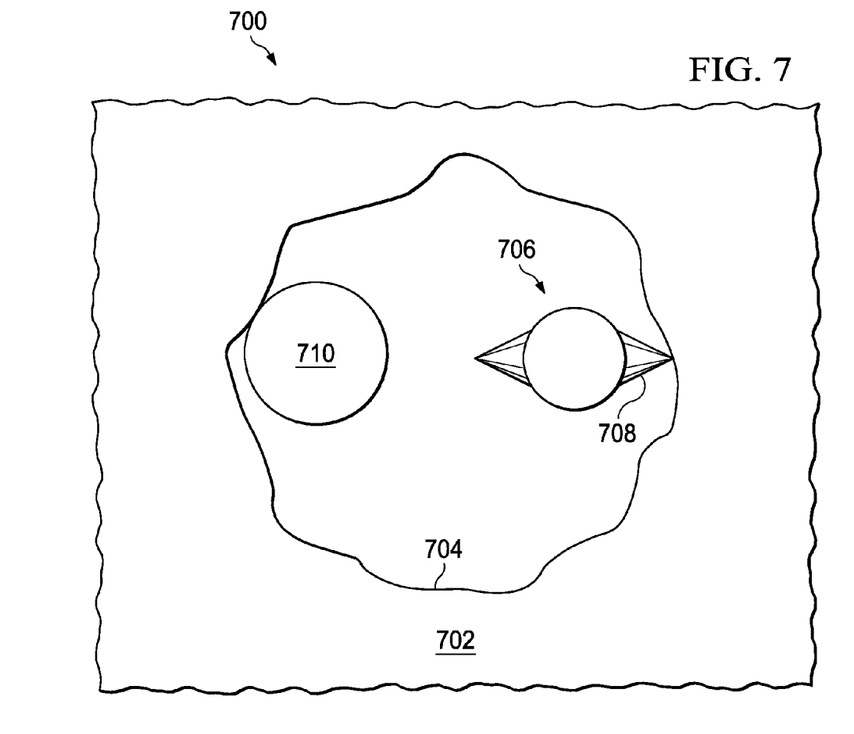
FIG. 7 is a top view of a contact hole in an IC during a profile measurement using an AFM probe according to an embodiment of the instant invention, with a flared tip probe for comparison purposes.

FIG. 7 is a top view of a contact hole in an IC during a profile measurement using an AFM probe according to an embodiment of the instant invention, with a flared tip probe for comparison purposes. Contact hole (700) in a pre-metal dielectric layer (702) has features a few nanometers in size on its sidewall (704). An AFM probe according to an embodiment of the instant invention (706) has a probe tip (708) with a radius less then 1 nanometer, and can resolve features in the hole sidewall (704) down to approximately 1 nanometer in size. A flared probe (710) typically has a radius greater than 20 nanometers, and cannot resolve features smaller than 20 nanometers in the hole sidewall (704). The use of an AFM probe according to an embodiment of the instant invention is advantageous because it provides the user with more detailed information regarding the surface profile of contact holes and via holes than measurements with other AFM probes.

Figure 8A:
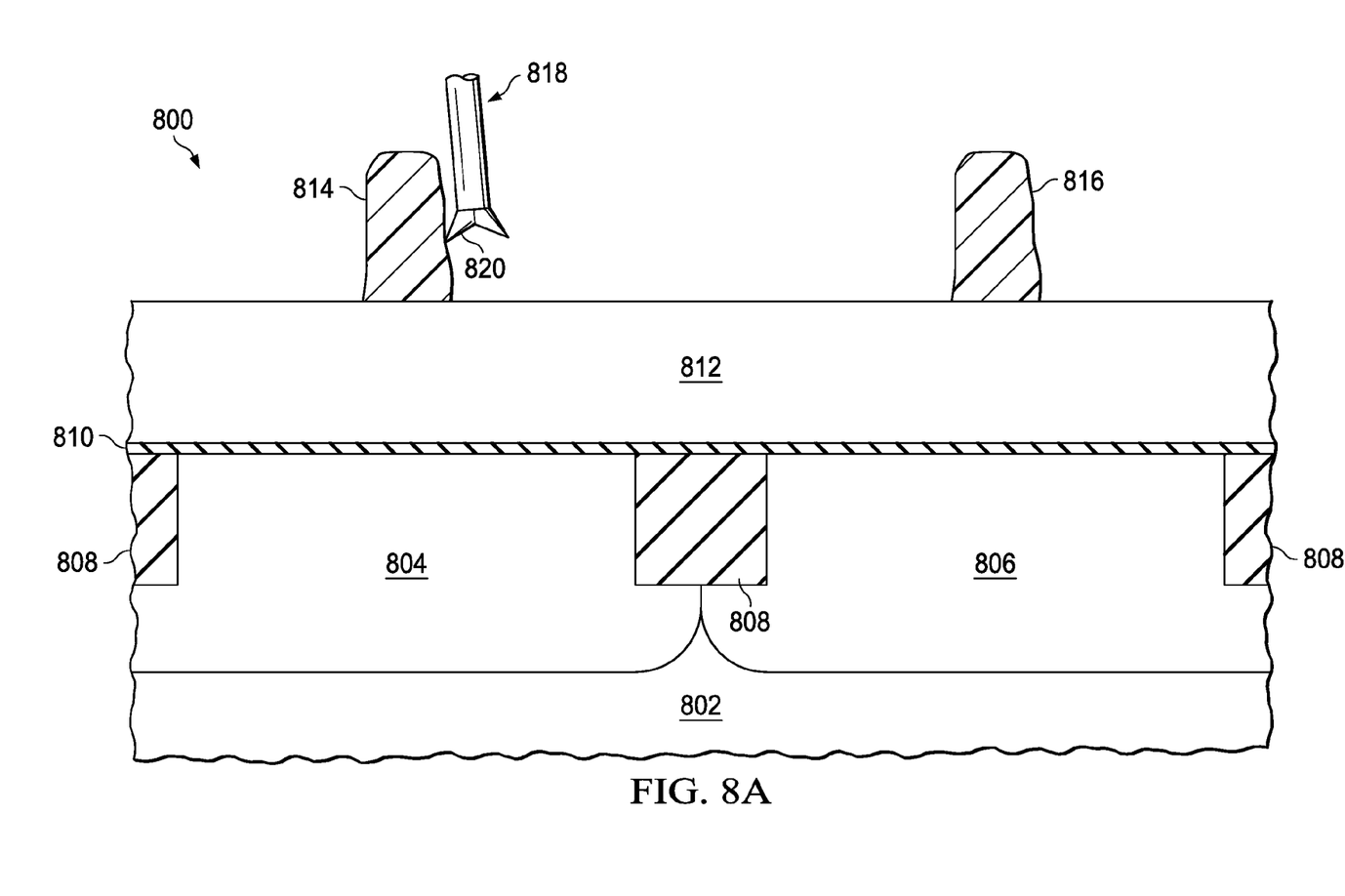
FIGS. 8A through 8E are cross-sections of an IC during fabrication encompassing AFM measurements using an embodiment of the instant invention.
Figure 8B:
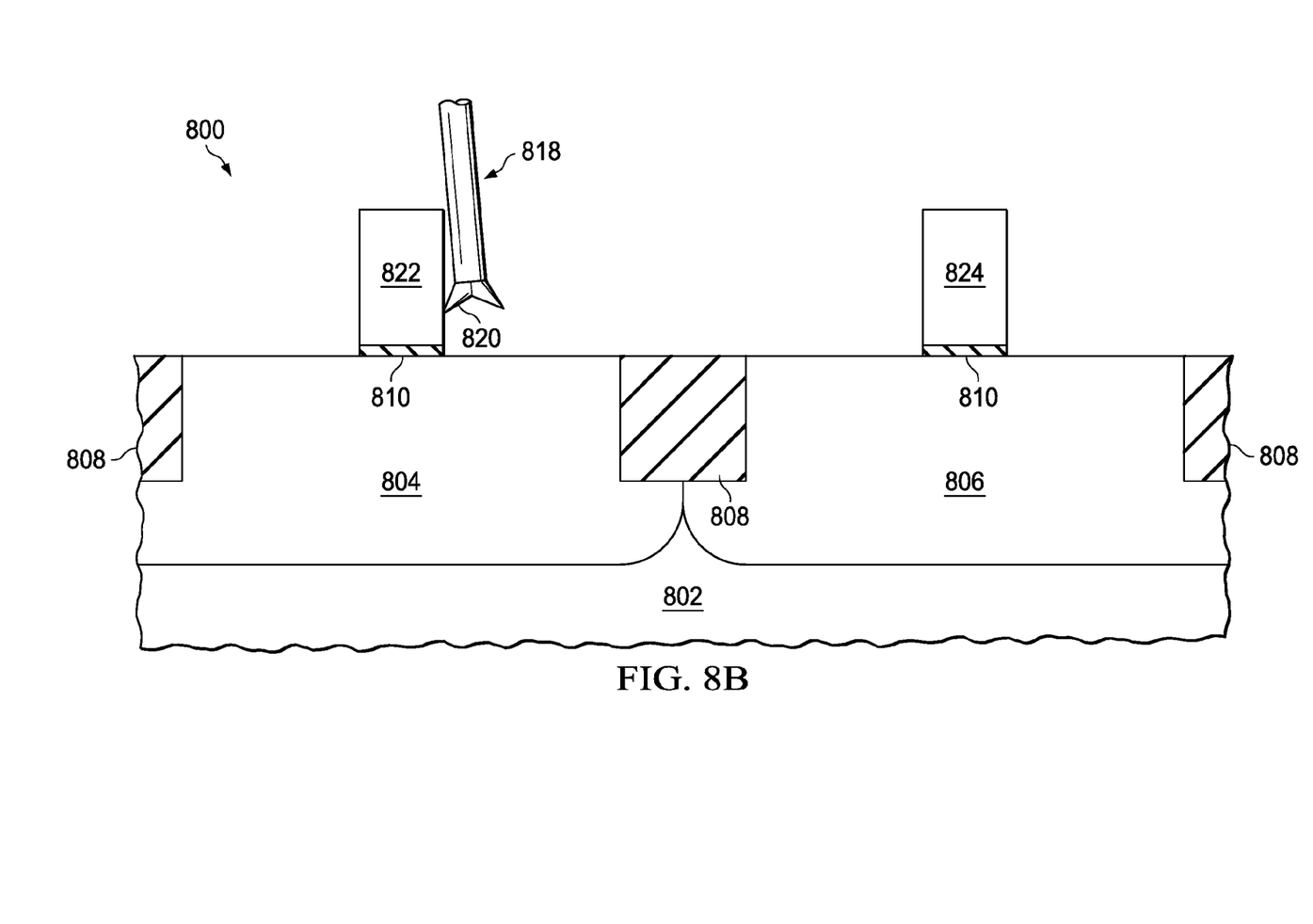
Figure 8C:
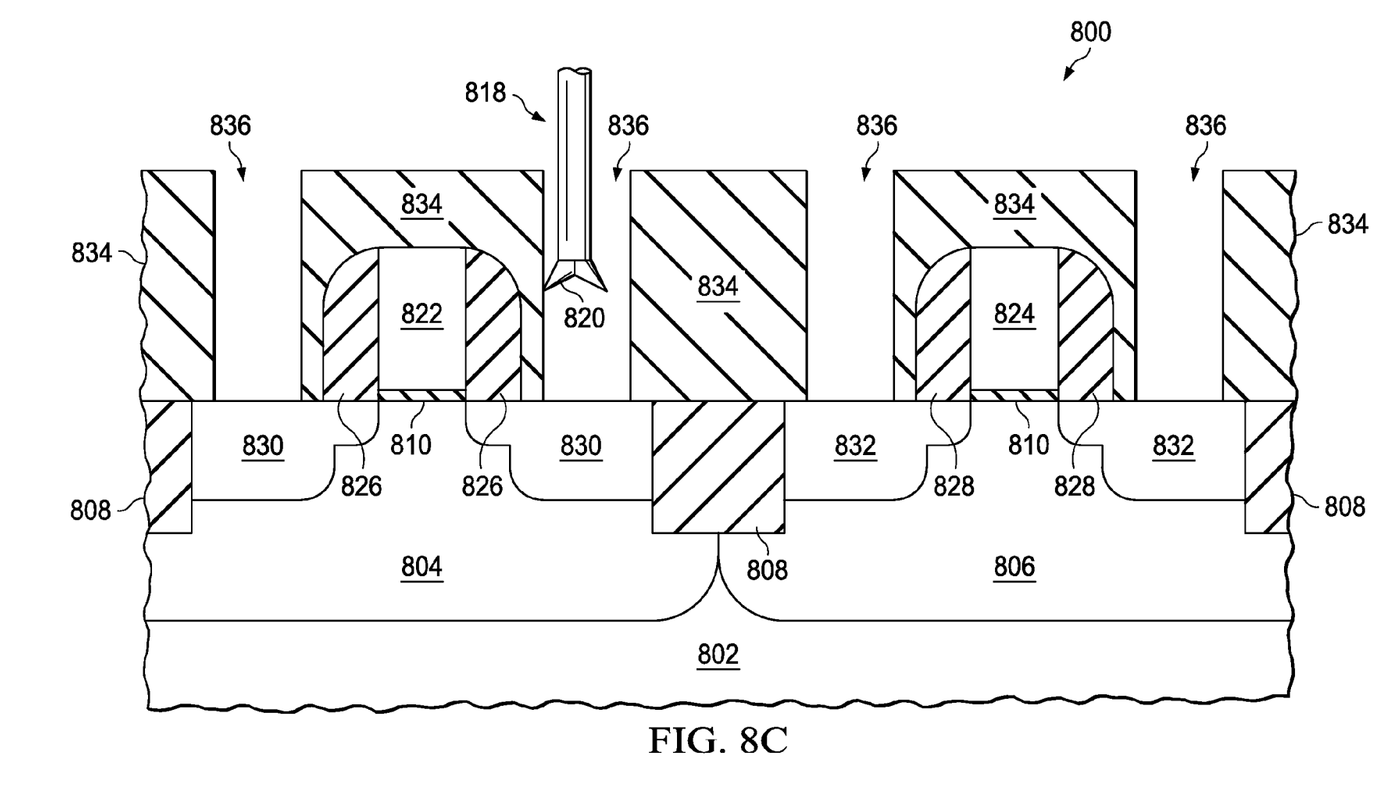
Figure 8D:
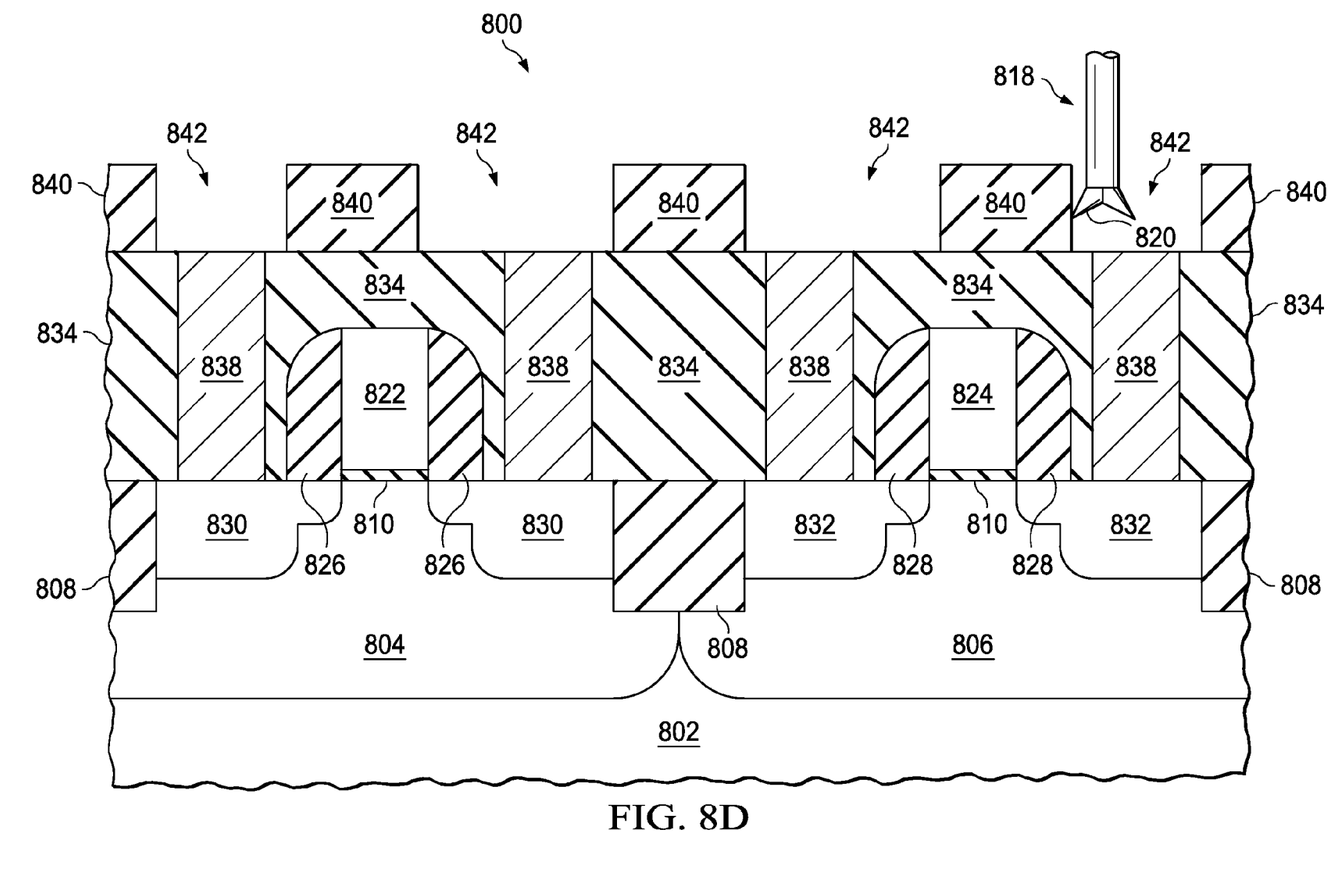
Figure 8E:
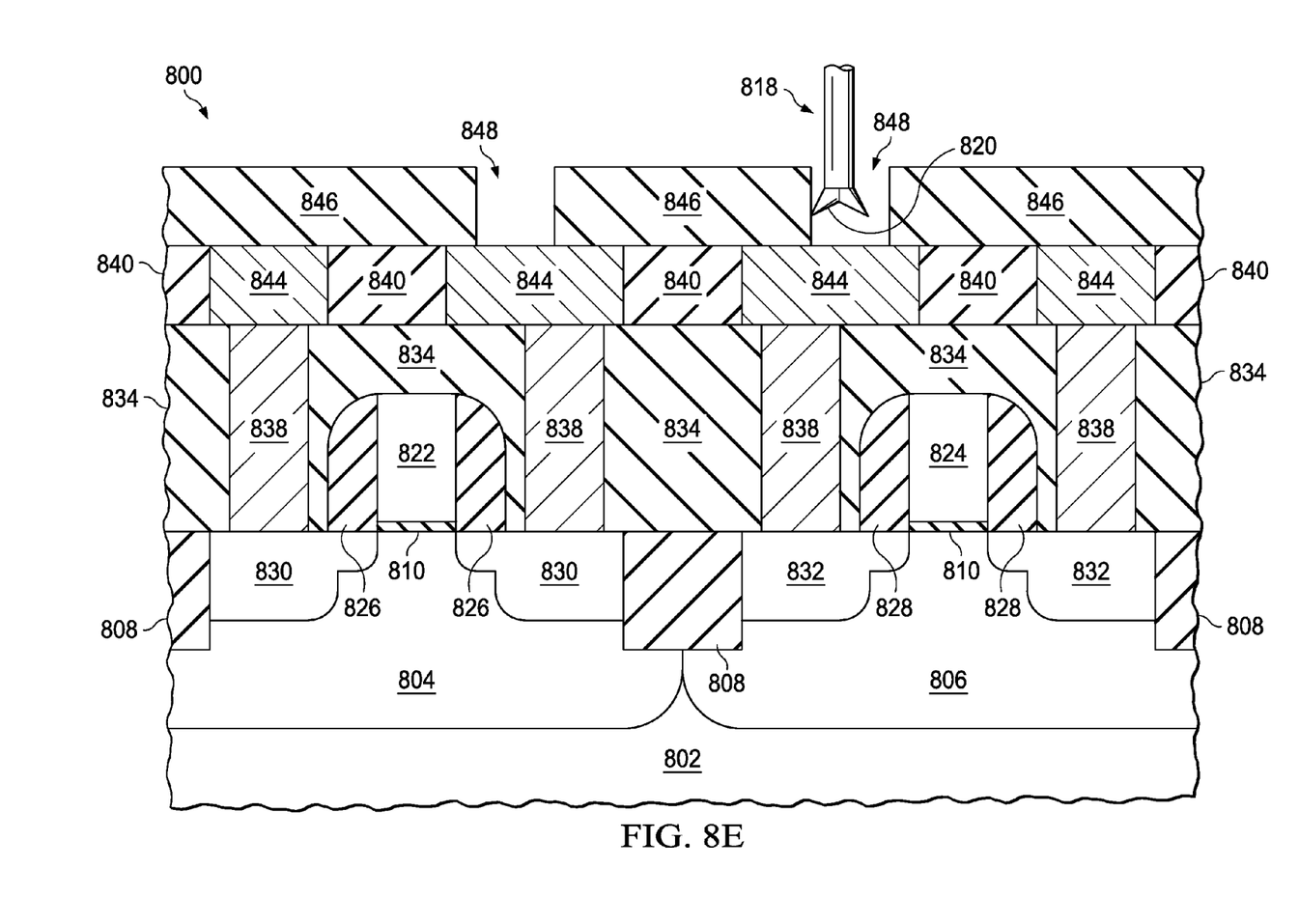

FIGS. 8A through 8E are cross-sections of an IC during fabrication encompassing AFM measurements using an embodiment of the instant invention. FIG. 8A depicts the IC during an AFM profile measurement of a photoresist structure in an MOS transistor gate pattern. FIG. 8B depicts the IC during an AFM profile measurement of an MOS transistor gate. FIG. 8C depicts the IC during an AFM profile measurement of a contact hole. FIG. 8D depicts the IC during an AFM profile measurement of a metal interconnect trench. FIG. 8E depicts the IC during an AFM profile measurement of a via hole.

Referring to FIG. 8A, IC (800) includes a substrate (802), typically p-type silicon, an n-type region formed in the substrate, known as an n-well (804), a p-type region formed in the substrate, known as a p-well (806), and regions of field oxide (808), typically silicon dioxide, formed in the substrate by Local Oxidation of Silicon (LOCOS) or Shallow Trench Isolation (STI). A gate dielectric layer (810), typically silicon dioxide, silicon dioxide with nitrogen, silicon oxy-nitride, or hafnium oxide, is formed on a top surface of the n-well (804), p-well (806) and field oxide (808). A layer of gate material (812), typically polycrystalline silicon, is formed on a top surface of the gate dielectric layer (810). A photoresist pattern including a p-channel MOS transistor gate photoresist structure (814) and an n-channel MOS transistor gate photoresist structure (816) are formed on a top surface of the gate material layer (812). An AFM probe according to an embodiment of the instant invention (818) is positioned to perform a profile measurement of the p-channel MOS transistor gate structure (814). The left tip (820) of the AFM probe (818) is in contact with the p-channel MOS transistor gate structure (814). The AFM probe (818) may be tilted to the left of vertical, as discussed in reference to FIG. 3A above.

Referring to FIG. 8B, a p-channel MOS transistor gate (822) and an n-channel MOS transistor gate (824) are formed on the top surface of the gate dielectric layer (810). The AFM probe (818) is positioned to perform a profile measurement of the p-channel MOS transistor gate (822). The left tip (820) of the AFM probe (818) is in contact with the p-channel MOS transistor gate (822). The AFM probe (818) may be tilted to the left of vertical, as discussed in reference to FIG. 3A above.

Referring to FIG. 8C, PMOS sidewall spacers (826), typically layers of silicon dioxide and silicon nitride, are formed abutting to the p-channel MOS transistor gate (822), and NMOS sidewall spacers (828), also typically layers of silicon dioxide and silicon nitride, are formed abutting to the n-channel MOS transistor gate (824). P-type source and drain regions (830) are formed in the n-well (804) adjacent to the p-channel MOS transistor gate (822). N-type source and drain regions (832) are formed in the p-well (806) adjacent to the n-channel MOS transistor gate (824). A pre-metal dielectric (PMD) layer (834), typically silicon dioxide, is formed on a top surface of the gates (822, 824), the sidewall spacers (826, 828) and the p-type source and drain regions (830), the n-type source and drain regions (832) and field oxide (808). Contact holes (836) are formed in the PMD layer (832). The AFM probe (818) is positioned to perform a profile measurement of a contact hole (836). The left tip (820) of the AFM probe (818) is in contact with PMD dielectric layer material at the contact hole sidewall.

Referring to FIG. 8D, contacts (838), typically tungsten, are formed in the PMD dielectric layer (834). An intra-level dielectric layer (840), typically low-k dielectric material such as organo-silicate glass, is formed on a top surface of the PMD layer (834) and the contacts (838). Trenches (842) for metal interconnect lines have been etched in the intra-level dielectric layer (840). The AFM probe (818) is positioned to perform a profile measurement of a metal interconnect line trench (842). The left tip (820) of the AFM probe (818) is in contact with intra-level dielectric layer material at the trench sidewall.

Referring to FIG. 8E, metal interconnect lines (844) are formed in the intra-level dielectric layer (840). An inter-level dielectric layer (846), also typically low-k dielectric material such as organo-silicate glass, is formed on a top surface of the metal interconnect lines (842) and the intra-level dielectric layer (840). Via holes (848) are etched in the inter-level dielectric layer (844). The AFM probe (818) is positioned to perform a profile measurement of a via hole (848). The left tip (820) of the AFM probe (818) is in contact with inter-level dielectric layer material at the via sidewall.

What is claimed is:

1. A probe for atomic force microscopy, comprising:
a probe shaft, oriented vertically;
a left tip, comprising two ends, wherein a first end is attached to said probe shaft, and a second end is atomically sharp and angled downward from said probe shaft at approximately 45 degrees to the left of said probe shaft; and
a right tip, comprising two ends, wherein a first end is attached to said probe shaft, and a second end is atomically sharp and angled downward from said probe shaft at approximately 45 degrees to the right of said probe shaft.

2. The probe of claim 1, wherein said left tip and said right tip are comprised of diamond-like carbon.

3. The probe of claim 1, wherein said left tip and said right tip are comprised of silicon carbide.

4. The probe of claim 1, wherein said left tip and said right tip are comprised of silicon.

5. The probe of claim 1, wherein said probe shaft is comprised of carbon nanotube material.

6. The probe of claim 1, wherein a diameter of said shaft is less than 40 nanometers, and a lateral distance between said second end of said left tip and said second end of said right tip is less than 50 nanometers.

7. The probe of claim 1, wherein a diameter of said shaft is less than 15 nanometers, and a lateral distance between said second end of said left tip and said second end of said right tip is less than 25 nanometers.

8. A method of measuring a profile of a structure in an integrated circuit by atomic force microscopy, comprising the steps of:
providing an atomic force microscopy probe, comprising
a probe shaft, oriented vertically;
a left tip, comprising two ends, wherein a first end is attached to said probe shaft, and a second end is atomically sharp and angled downward from said probe shaft at approximately 45 degrees to the left of said probe shaft; and
a right tip, comprising two ends, wherein a first end is attached to said probe shaft, and a second end is atomically sharp and angled downward from said probe shaft at approximately 45 degrees to the right of said probe shaft;
profiling a first side of said structure with said left tip; and
profiling a second side of said structure with said right tip.

9. The method of claim 8, wherein said structure is a gate of a MOS transistor, and wherein the step profiling a first side of said gate with said left tip further comprises the step of tilting said probe counterclockwise from vertical;
and wherein the step profiling a second side of said gate with said right tip further comprises the step of tilting said probe clockwise from vertical.

10. The method of claim 8, wherein said structure is a photoresist structure, and wherein the step profiling a first side of said photoresist structure with said left tip further comprises the step of tilting said probe counterclockwise from vertical;
and wherein the step profiling a second side of said photoresist structure with said right tip further comprises the step of tilting said probe clockwise from vertical.

11. The method of claim 8, wherein said structure is a via hole.

12. The method of claim 8, wherein said structure is a contact hole.

13. The method of claim 8, wherein said structure is an interconnect trench.

14. The method of claim 8, further comprising the step of sharpening said left tip and said right tip using a field emission technique.

15. The method of claim 8, wherein the steps of profiling a first side of said structure and profiling a second side of said structure further comprise the step of measuring both vertical and horizontal profiles to generate a surface profile map.

16. A method of forming an integrated circuit, comprising the steps of:
providing a substrate;
forming an n-well in said substrate;
forming a p-well in said substrate;
forming regions of field oxide in said substrate;
forming a gate dielectric layer on a top surface of said n-well, said p-well and said regions of field oxide;
forming a layer of MOS transistor gate material on a top surface of said gate dielectric layer;
forming a photoresist pattern for MOS transistor gates on a top surface of said layer of MOS transistor gate material, comprising an n-channel MOS transistor gate photoresist structure and a p-channel MOS transistor gate photoresist structure;
providing probe for atomic force microscopy, comprising:
a probe shaft, oriented vertically;
a left tip, comprising two ends, wherein a first end is attached to said probe shaft, and a second end is atomically sharp and angled downward from said probe shaft at approximately 45 degrees to the left of said probe shaft; and
a right tip, comprising two ends, wherein a first end is attached to said probe shaft, and a second end is atomically sharp and angled downward from said probe shaft at approximately 45 degrees to the right of said probe shaft;
performing a surface profile measurement of said p-channel MOS transistor gate photoresist structure by a process comprising the steps of:
tilting said probe left of vertical by 2 to 10 degrees;
positioning said probe whereby said left tip contacts a right side of said p-channel MOS transistor gate photoresist structure;
moving said probe whereby said left tip stays in contact with said right side of said p-channel MOS transistor gate photoresist structure over a first defined measurement region;
moving said probe away from said p-channel MOS transistor gate photoresist structure;
tilting said probe right of vertical by 2 to 10 degrees;
positioning said probe whereby said right tip contacts a left side of said p-channel MOS transistor gate photoresist structure;
moving said probe whereby said right tip stays in contact with said left side of said p-channel MOS transistor gate photoresist structure over a second defined measurement region; and
moving said probe away from said p-channel MOS transistor gate photoresist structure; and
analyzing data from said surface profile measurement of aid p-channel MOS transistor gate photoresist structure to adjust process parameters for forming MOS transistor gates.

17. The method of claim 16, further comprising the steps of:
forming an n-channel MOS transistor gate and a p-channel MOS transistor gate on a top surface of said gate dielectric layer;
performing a surface profile measurement of said p-channel MOS transistor gate by a process comprising the steps of:
tilting said probe left of vertical by 2 to 10 degrees;
positioning said probe whereby said left tip contacts a right side of said p-channel MOS transistor gate;
moving said probe whereby said left tip stays in contact with said right side of said p-channel MOS transistor gate over a third defined measurement region;
moving said probe away from said p-channel MOS transistor gate;
tilting said probe right of vertical by 2 to 10 degrees;
positioning said probe whereby said right tip contacts a left side of said p-channel MOS transistor gate;

moving said probe whereby said right tip stays in contact with said left side of said p-channel MOS transistor gate over a fourth defined measurement region; and
moving said probe away from said p-channel MOS transistor gate; and
analyzing data from said surface profile measurement of said p-channel MOS transistor gate to adjust process parameters for forming MOS transistor gates.

18. The method of claim 17, further comprising the steps of:
forming NMOS sidewall spacers abutting said n-channel MOS transistor gate;
forming PMOS sidewall spacers abutting said p-channel MOS transistor gate;
forming n-type source and drain regions in said p-well adjacent to said n-channel MOS transistor gate;
forming p-type source and drain regions in said n-well adjacent to said p-channel MOS transistor gate;
forming a PMD layer on a top surface of said n-channel MOS transistor gate, said p-channel MOS transistor gate, said NMOS sidewall spacers, said PMOS sidewall spacers, said n-type source and drain regions and said p-type source and drain regions;
forming a plurality of contact holes in said PMD layer;
performing a surface profile measurement of one of said contact holes in said PMD layer by a process comprising the steps of:
positioning said probe whereby said left tip contacts a left side of said contact hole;
moving said probe whereby said left tip stays in contact with said left side of said contact hole over a fifth defined measurement region;
positioning said probe whereby said right tip contacts a right side of said contact hole;
moving said probe whereby said right tip stays in contact with said right side of said contact hole over a sixth defined measurement region; and
moving said probe away from said contact hole; and
analyzing data from said surface profile measurement of said contact hole to adjust process parameters for forming contact holes.

19. The method of claim 18, further comprising the steps of:
forming contacts in said PMD layer;
forming an intra-level dielectric layer on a top surface of said contacts and said PMD layer;
forming a plurality of trenches for metal interconnect lines in said intra-level dielectric layer;
performing a surface profile measurement of one of said trenches in said PMD layer by a process comprising the steps of:
tilting said probe left of vertical by 2 to 10 degrees;
positioning said probe whereby said left tip contacts a left side of said trench;
moving said probe whereby said left tip stays in contact with said left side of said trench over a seventh defined measurement region;
moving said probe away from said trench;
tilting said probe right of vertical by 2 to 10 degrees;
positioning said probe whereby said right tip contacts a right side of said trench;
moving said probe whereby said right tip stays in contact with said right side of said trench over an eighth defined measurement region; and
moving said probe away from said trench; and
analyzing data from said surface profile measurement of said trench to adjust process parameters for forming trenches.

20. The method of claim 19, further comprising the steps of:
forming a plurality of metal interconnect lines in said intra-level dielectric layer;
forming an inter-level dielectric layer on a top surface of said metal interconnect lines and said intra-level dielectric layer;
forming a plurality of via holes in said inter-level dielectric layer;
performing a surface profile measurement of one of said via holes in said inter-level dielectric layer by a process comprising the steps of:
positioning said probe whereby said left tip contacts a left side of said via hole;
moving said probe whereby said left tip stays in contact with said left side of said via hole over a ninth defined measurement region;
positioning said probe whereby said right tip contacts a right side of said via hole;
moving said probe whereby said right tip stays in contact with said right side of said via hole over a tenth defined measurement region; and
moving said probe away from said via hole; and
analyzing data from said surface profile measurement of said via hole to adjust process parameters for forming via holes.

* * * * *